United States Patent

Wilhoit et al.

[11] Patent Number: 5,407,611
[45] Date of Patent: Apr. 18, 1995

[54] PROCESS OF CORONA TREATING A THERMOPLASTIC TUBULAR FILM

[75] Inventors: Darrel L. Wilhoit, Joliet, Ill.; Vincent J. Dudenhoeffer, Centerville, Iowa

[73] Assignee: Viskase Corporation, Chicago, Ill.

[21] Appl. No.: 200,328

[22] Filed: Feb. 23, 1994

Related U.S. Application Data

[62] Division of Ser. No. 872,873, Apr. 23, 1992, Pat. No. 5,328,705.

[51] Int. Cl.⁶ .............................................. B29C 71/04
[52] U.S. Cl. ......................................... 264/22; 204/165
[58] Field of Search ............................ 264/22; 204/165

[56] References Cited

U.S. PATENT DOCUMENTS

| | | | |
|---|---|---|---|
| 4,150,697 | 4/1979 | Dowell et al. | 138/118.1 |
| 4,411,919 | 10/1983 | Thompson | 426/412 |
| 4,463,778 | 8/1984 | Judd et al. | 138/118.1 |
| 4,784,863 | 11/1988 | Lustig et al. | 426/113 |
| 4,888,223 | 12/1989 | Sugimoto et al. | 426/129 X |
| 5,047,253 | 9/1991 | Juhl et al. | 426/113 |
| 5,051,266 | 9/1991 | Juhl et al. | 426/129 |
| 5,089,073 | 2/1992 | Schirmer | 156/244.11 |
| 5,219,002 | 1/1993 | Stenger et al. | 138/118.1 |
| 5,296,170 | 3/1994 | Noritsugu et al. | 264/22 |

FOREIGN PATENT DOCUMENTS

| | | |
|---|---|---|
| 951675 | 7/1974 | Canada. |
| 127296 | 12/1984 | European Pat. Off. . |
| 510891 | 10/1992 | European Pat. Off. . |
| 2333084 | 6/1977 | France . |
| 2009033 | 6/1979 | United Kingdom . |

*Primary Examiner*—Leo B. Tentoni
*Attorney, Agent, or Firm*—Roger Aceto

[57] ABSTRACT

A meat product package including an enclosing film having an EVA-containing inside surface and an in situ aqueous medium-cooked meat product in adhering relation to the film inside surface as the meat contacting and adhering surface. Starch particles are preferably dispersed across the meat contacting surface which has been both irradiated and subjected to corona treatment. A method for corona treating a thermoplastic tube inside surface in which small particles within the flat tube separate opposite surfaces providing voids, and the electric discharge crosses the flat tube through the voids.

10 Claims, 2 Drawing Sheets

PROCESS OF CORONA TREATING A THERMOPLASTIC TUBULAR FILM

This application is a division of prior U.S. application Ser. No. 07/872,873 filed Apr. 23, 1992 which is now U.S. Pat. No. 5,328,705 issued Jul. 12, 1994.

TECHNICAL FIELD

The present invention relates to pre-cooked food products and more particularly to food products such as meat packaged and cooked in a film wherein the film reduces exudation of liquids from the food product during cooking. Another aspect of the invention relates to a method for corona treating the inside surface of a flexible thermoplastic film.

BACKGROUND OF THE INVENTION

Food products which are packaged in so-called "cook-in" films are well known in the art. Cook-in films, either in the form of tubular casings or bags, are used for packaging a food product such as meat wherein the food product is enclosed in the film and then processed, eg. cooked, in situ usually by immersion in a hot water bath. Typical food products packaged and processed in this fashion include, among others, hams, turkey hams, fish and poultry rolls.

Food products packaged and processed in this fashion are often sold to the retail consumer market still encased in the film. As an alternative, the processor has the option to remove the film after cooking and repackage the cooked food product either whole or sliced, for retail sale. In either case, a very desirable feature of the food product package is that the cook-in film suppresses the formation of "cook-out", also referred to as "purge". The terms "cook-out" and "purge" refer to the liquid which tends to exude from a food product during cooking. This liquid exudate generally comprises water, water-fat emulsion, broth or other food juices. Cook-out is objectionable for several reasons. For example, it will cause a layer of liquid to form between the film and food, and also collect as pools in any voids between the film and the surface of the food product. In cases where the cook-in film is not removed for retail sale, these layers or pockets of exudate liquid detract from the appearance of the package and may deter consumer purchase. Also, this accumulation of liquid adversely affects the preservability of the cooked, packaged food.

The exudate liquid further represents an undesirable weight loss. This is especially true in cases where the cook-in film is removed for slicing and/or repackaging, in that the liquid is not reincorporated into the repackaged food product.

To a large extent, the quantity of cook-out or purge is dependent upon the ability of the surface of the food product to wet the food contacting surface of the packaging film. If the film surface is wetted by the food product, the film will adhere to the food product surface during cooking and this adherence will prevent cook-out.

"Wetting" is defined for purposes of the present invention as an affinity between the film surface and the food. One indication of this affinity is the wetting tension of the film surface as measured by ASTM D2578-67.

Using meat emulsion as an example, adherence of a film to the meat product surface will increase as the wetting tension of the film surface increases. However, if the adhesion is too high, the meat surface is disrupted by chunks of the cooked meat adhering to the cook-in film when the film is removed. In practice, the adhesion must be controlled to provide the adhesion necessary to prevent cook-out while keeping the adhesion below a level which causes chunks of cooked meat to pull off when the cook-in film is removed.

A further advantage of having the cook-in film adhere to the food is that it provides the package with a satisfactory outer appearance. This is especially desirable where the cook-in film is not removed prior to sale at retail.

Accordingly, a cooked food product package including a cook-in film encasing a food product cooked in situ within the film wherein the food product wets the film so the film tightly adheres to the cooked food surface not only improves the package appearance but also extends shelf life and reduces weight loss attributed to the liquid cook-out.

Other desirable characteristics for cook-in films include high tensile strength and puncture resistance at typical cooking temperatures (68°-82° C.) and, for certain end uses, the film should have a low oxygen permeability and be heat shrinkable. These desirable cook-in film characteristics are preferably obtained by constructing a laminate film. For example, a meat adhering cook-in film as disclosed in U.S. Pat. No. 4,784,863 is a three layer film wherein an oxygen barrier layer comprising a vinylidene chloride-methyl acrylate copolymer (MA-VDC) is disposed between inner and outer layers. The outer layer is composed of a material, or a blend of materials, able to withstand the abuse and abrasion of handling the package. Suitable outer layers as disclosed in the '863 Patent include linear low density polyethylene (LLDPE), very low density polyethylene (VLDPE), ethylene-vinyl acetate (EVA) or blends of these materials. The inner layer, which includes the film surface in direct contact with the meat product, is an EVA having a vinyl acetate (VA) content of between about 3% and about 18%.

U.S. Pat. No. 4,888,223 (the disclosure of which is incorporated by reference) discloses a cook-in film of two or more layers. In a three layer embodiment, the outer layer is composed of nylon. Nylon provides the required barrier properties and is abuse and abrasion resistant. The innermost layer is a polyethylene. An intermediate adhesive layer bonds the outer nylon layer and inner polyethylene layers together.

It also is known in the art to subject the cook-in film to various treatments to improve its food adhering characteristics. For example, U.S. Pat. No. 4,411,919 discloses that by subjecting the food adhering surface of a polymeric olefin film to an energetic radiation in the presence of oxygen, the surface is oxidized to render the surface characteristics of the film more compatible with the surface characteristics of the food product. The '919 Patent discloses that suitable energetic radiation treatments include corona discharge, flame, plasma, ultraviolet and electron beam radiation.

In the '863 Patent mentioned above, the food adhering property of the inner EVA layer of the cook-in film is improved by dispersing starch particles across the food adhering film surface and then irradiating the film. In the above mentioned '223 Patent the food adhering property of the polyethylene film inner layer is increased by subjecting the food contacting surface to a corona treatment.

The film inner surface of Patent '863—irradiated starch containing EVA—has acceptable cook-out (purge) as measured by good meat adhesion and little "fat out" (i.e. accumulation of high fat content material in concentrated form between the meat outer surface and the film inner surface) for most meats including premium grade boiled ham having less than about 10% fat and usually less than about 5% high collagen meat protein of the total available meat protein. Unfortunately when the meat to be cooked insitu is a commodity style boiled ham having a product composition of more than about 10% fat and usually more than about 5% high collagen meat protein of the total available meat portion, the irradiated dispersed starch particle—containing EVA inner layer-to-meat adhesion is only marginally satisfactory. Improved cook-out (purge) as measured by meat adhesion for commodity style boiled ham has been realized with the film surface of U.S. Pat. No. 5,051,266, comprising a blend of between about 30% and about 75% of the aforementioned EVA and between about 25% and about 70% of an unneutralized acid copolymer of an alpha-olefin. This compound has the formula $RHC=CH_2$ where R is H or $C_1$ to $C_8$ alkyl and an alpha, beta-ethylenically unsaturated carboxylic acid, as for example ethylene acrylic acid (EAA). The film surface is irradiated at dosage of at least about 2 MR.

The Patent '266 type film surface—an irradiated EVA-EAA blend—provides improved cook-out (purge), but based on commercial use, even further improvement i.e. lower cook-out (purge) is desirable for high collagen, high fat type meats.

There is a need for an improved method for corona treating the inside surface of a flexible thermoplastic tubular film. In the prior art method as for example described in the aforementioned U.S. Pat. No. 4,888,223, a tube is inflated with gas in an amount at least sufficient to prevent the contact of internal surface areas of the tube. This transverse space corresponds to the distance between the opposing corona discharge electrodes. Roller-type electrodes are located in transversely positioned pairs with each pair longitudinally spaced from each adjacent pair of electrodes, with one roll member being a discharge electrode and the other roll member being a grounded electrode.

Since the prior art roller electrodes support the longitudinally moving gas inflated tube, there is no air gap between the tube outer surface and the supporting roller electrode surface, and it is not possible to simultaneously apply a significant corona discharge to the tube outer and inner surfaces, only the latter. Such simultaneous treatment may be desirable to increase the wetting tension of the inner surface for improved meat adhesion during cook-in, and also increase the wetting tension of the outer surface for printing thereon.

Also in the prior art system for corona treatment of inside surfaces of flexible thermoplastic tubular films, each roller electrode requires a slip ring to transfer electricity from a stationary member to the rotating electrode, and these slip rings have a high wear rate. Finally the prior art corona treatment system requires power driven nip rolls for longitudinal movement of the gas-supported tube through the corona-discharge region.

OBJECTS OF THE INVENTION

A primary object of one aspect of the present invention is to provide a food containing package including a cook-in film which encases an in situ, aqueous medium cooked food product wherein the inner surface of the film is of the EVA type and maintained in an improved wetting and adhering relationship with the food product.

Another object is to provide such a package wherein the film EVA type surface has enhanced food adhesion properties.

A further object is to provide such a package wherein cook-out (purge) from the package, after cooking, is reduced by increasing the wetting tension of the EVA type film surface in contact with the food product.

Still another object of the present invention is to provide such a package wherein the meat adhering EVA type layer of the cook-in film is treated to enhance its meat adhering properties.

The primary object of another aspect of the invention is to provide an improved method for corona treating the inside surface of a flexible thermoplastic tubular film, which method does not require spaced pairs of roller-type electrodes but instead a group of fixed position electrodes spaced from each other in the corona discharge path.

Another object is to provide such a method which does not require a pair of mechanically driven nip rolls at each end of the corona discharge path to drive the film tube and to seal the inflated tube while transversing this path.

Still another object is to provide such a corona treatment system which is capable of simultaneously corona treating the tube outer surface and its inner surface.

SUMMARY OF THE INVENTION

One aspect of the present invention is a cooked food product package including a cook-in film encasing an in situ aqueous medium cooked food product. The film has a food adhering surface containing EVA, which has been irradiated and treated by a corona discharge.

It is well known in the art that corona treatment will increase the wetting tension of a film and thereby improve its meat adhering characteristic. What is surprising, however, is that subjecting an EVA-containing film surface to both irradiation and corona treatment will provide a still further improvement in purge reduction and food adherence even though there is no commensurate increase in wetting tension over a corona treated, but nonirradiated film.

In a preferred form, the film is a tube wherein the inner surface of the tubular film defines the wetting and food adhering surface. Where the film is in tubular form, it has been found advantageous to uniformly disperse starch particles across the food adhering surface at a level of about 20 to about 30 $g/1000\ ft^2$.

Preferably irradiation is at a dosage level of at least 2 MR and corona treatment is sufficient to provide a surface wetting tension of between about 36 and about 50 dyne/cm.

The tubular film has an inner surface wherein EVA may be the major constituent or substantially the only constituent. Alternatively the inner surface may be a blend of EVA with another compatible material as for example a polyolefin such as ethylene acrylic acid copolymer (EAA). Although the EVA-containing surface may be the only layer, the film preferably comprises three layers wherein the intermediate layer is a barrier layer composed of a vinylidene chloride-methyl acrylate (MA-VDC) copolymer. The outer layer of the preferred multilayer tubular film is a blend of EVA and very low density polyethylene (VLDPE) which has a density of about 0.912 g/cm³.

Another aspect of the invention relates to a method for corona treating the inside surface of a flexible thermoplastic tubular film wherein a substantially flat film tube is provided with particles of less than about 1½ mil (37.5 microns) average size within the inner space of the flat tube. The particles are provided in sufficient quantity to separate at least a portion of opposite inside surfaces of the flat tube in the transverse direction, and provide voids between the particles within the flat tube. An electric discharge is established across these opposite inside surfaces through the voids of the particle-containing flat tube so as to corona treat the inside surfaces.

The inside surface to be corona treated is preferably a polyolefin and most preferably contains EVA. The particles are preferably starch and also preferably at least a portion of the particles are adhered to the tube inside surface prior to the electric discharge. The initially unadhered particles are adhered to the tube inside surface during the electric discharge. Also, after the corona treatment the particles are preferably present within the inner space of the flat tube in sufficient quantity to prevent the tube inside surfaces from blocking. When the particles are starch they are preferably present in quantity of between about 20 and about 30 gms/1000 ft² tube inside surface. Gas is preferably introduced in the particle-containing flat tube inner space in sufficient quantity to further separate the particles without inflating the tube.

DETAILED DISCUSSION OF THE INVENTION

Figure 1:
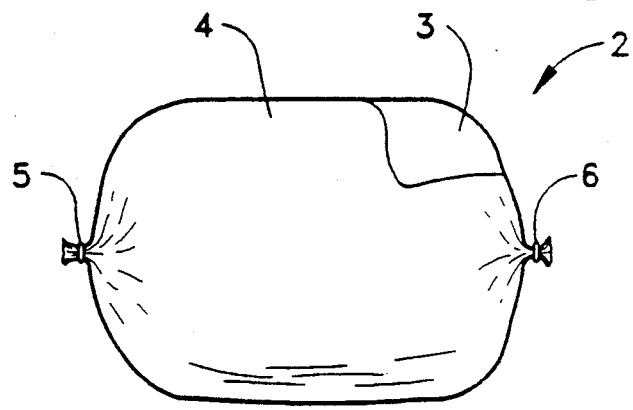
FIG. 1 is a perspective view of a food product package including a food product encased in a tubular cook-in film.

The prior art has known that wetting of the film surface by the food product causes the film to adhere to the food product encased and cooked in the film. It now has been found that the wetting of the film surface and food adhesion of an EVA-containing film surface are enhanced by both irradiating the film and corona treating the film surface which becomes the food adhering surface. The sequence of corona treating the film's food adhering EVA-containing surface and irradiating at least the film thickness containing this EVA, is not critical. As will be demonstrated in an example, tests have shown that reduced cook-out (purge) is realized irrespective of whether the EVA-containing surface is first irradiated or first corona treated, as long as both operations are performed on the film to be used in preparation of the package used to cook the food.

While irradiation and corona treatment are each known to improve the meat adherence of films, the improvement derived from the combination of irradiation and corona treatment of the food adhering surface is surprising and unexpected. This is because the wetting tension of the film surface is one factor which determines whether the food product is able to wet the film surface and therefore, the adhesion characteristics of the film. If all else is equal, films having comparable wetting tension values should have comparable food adhesion characteristics. However, it has been found that, even though an EVA-containing film subjected only to corona treatment has about the same wetting tension as the same film subject to both irradiation and corona treatment, the cook-out (purge) characteristic of the latter is substantially lower.

These film structures are preferably "heat-shrinkable", and as used herein this means the film has an unrestrained shrinkage of at least 20% in both the machine and transverse directions at 90° C. Typical shrink values for this type of film are in the range of 30–40% in both directions.

The films of this invention also preferably have a shrink force at 90° C. in grams/mil of at least 100 in both the machine and transverse directions, and typical shrink force values for the aforedescribed three layer heat shrinkable films are about 125 in both directions. The shrink force is that force or stress required to prevent shrinkage of the film. A high shrink force insures that the film pulls the cooked meat together during the cooking cycle so as to reduce the possibility of void spaces where purge may accumulate. Shrink force is determined by the following procedure: Film samples are cut 1 inch (2.54 cm) wide by 7 inches (17.8 cm) long in the transverse direction. The thickness of the film sample is determined and the film sample is secured between two clamps spaced 10 cm. apart. One clamp is a fixed position and the other is connected to a strain gauge transducer. The secured film is then immersed in a silicone oil bath maintained at a constant elevated temperature for a period of five seconds. During this time, the force in grams at the elevated temperature is recorded. At the end of this time, the film sample is removed from the bath and allowed to cool to room temperature whereupon the force in grams at room temperature is also determined. The shrink force for the film sample is then determined from the following equation wherein the result is obtained in grams per mil of film thickness (g/mil): Shrink Force (g/mil)=F/T wherein F is the force in grams and T is the average thickness of the film samples in mils.

Certain terms as used herein are to be understood as having the following meanings:

"Cook-in" refers to a film structurally capable of withstanding exposure to long and slow cooking conditions while containing a food product for in situ cooking, for example submersion in water at 70°–80° C. for 4–6 hours, or cooking in steam. Cook-in packaged food such as meats often are pre-packaged, pre-cooked meats which are directly transferred to the retailer still encased in the cook-in film. These types of meats may be consumed with or without warming. Cook-in films maintain integrity of the package and in the case of multilayer films, are delamination resistant. Cook-in films are preferably (but not necessarily) heat shrinkable under cook-in conditions so as to form a tightly fitting retail package. As an alternative, a meat processor may process a meat product in a cook-in film and after processing, remove the film and repackage the product, either whole or sliced, for sale at retail. In either instance, a cook-in film of the present invention must be wettable by the uncooked meat product so that the film will adhere during cooking, thereby reducing cook-out (purge).

"Cook-out" or "purge" refers to a liquid component collected from a meat product package after processing in a cook-in film. Cook-out or purge is quantified as a percentage of the total cooked food product package weight.

"Food product" means edible food as for example meat.

"Irradiation" means exposure to high energy radiation such as electrons, X-rays, gamma rays, beta rays and the like, which induce cross-linking between the molecules of an irradiated polymer. Preferably, irradiation is carried out by an electron accelerator and the dosage level is determined by standard dosimetry methods. The dosage is measured in "rads" wherein one rad is the absorbed dose of ionizing radiation equal to an energy of 100 ergs per gram of irradiated material. A megarad (MR) is one million rads.

"Adhering relation" between the aqueous medium cooked food outer surface and the film inner surface of the cooked food product package means that based on a peel test with a universal testing machine such as the Instron Model TM (Instron Corporation, Canton, Mass.) at a pull rate of 10 in./minute, the film will not separate from the meat at a force below about 10 grams for a one inch wide strip of film.

"Wetting tension" refers to a measure of the surface energy of a film in accordance with a test as described in ASTM D2578-67.

This invention also includes a cook-in film comprising:

a) a layer having a surface adapted for direct meat contact and having at least 25 wt. % ethylene vinyl acetate, starch particles on said surface in an amount of at least about 20 gm/1000 ft$^2$, and b) the surface being irradiated at a dosage of at least about 2 MR and corona treated at an energy level sufficient to provide the surface with a wetting tension of between about 36 and about 50 dyne/cm. This cook-in film is preferably a biaxially heat shrinkable multilayer tube comprising an oxygen barrier core layer between inner and outer tubular layers. The inner tubular layer has an inside surface defining the meat contact surface, the inner and outer tubular layers both contain ethylene vinyl acetate and the film has shrink force of at least about 100 g/mil at 90° C. both the machine and transverse directions.

Referring to the drawings, FIG. 1 shows a food product package generally indicated at 2. The package includes a food product 3 encased in a tubular cook-in biaxially heat shrinkable film casing 4. As shown in FIG. 1 the tubular casing is clipped at its ends 5, 6 to encase the food product. As an alternative one or both ends of the tubular casing may be closed by a heat seal (not shown).

Figure 2:
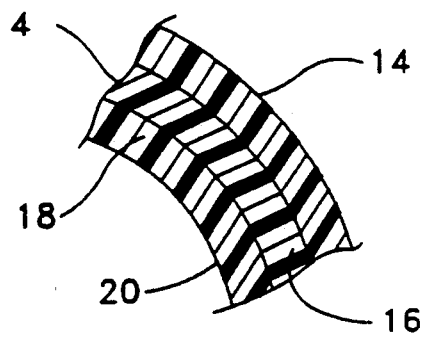
FIG. 2 is a view of an enlarged scale showing in cross section a portion of a three layer tubular wall embodiment of the package of FIG. 1.

FIG. 2 illustrates in more detail the structure of the food product-encasing film. In this regard the casing 4 is a cook-in tubular film as may be used in accordance with the present invention. The film preferably is a three layer film of the general type disclosed in U.S. Pat. No. 4,784,863 and U.S. Pat. No. 5,051,266, the disclosures of which are incorporated herein by reference. Briefly, FIG. 2 shows a preferred film to comprise a three layer tubular film including an outer layer 14, a core layer 16 and an inner layer 18.

The outer layer 14 is considered the abuse or abrasion resistant layer. The core layer 16 is a barrier layer, which functions with the other layers to provide an oxygen transmission rate through the entire multilayer film of below about 5 cc/100 in.$^2$/24 hrs./Atm. Inner layer 18 has the inner surface 20 of the tubular film which is against a meat product encased and processed, eg. cooked, within the tubular film.

In the film of the present invention the outer layer 14 preferably contains an ethylene vinyl acetate with a vinyl acetate content in the range of between about 3% and about 18%. This range provides a preferred film with the preferred biaxial heat shrink properties and adhesion to the core layer and allows the needed biaxial orientation and cook-in performance. The melt index of the EVA outer layer is preferably between about 0.1 and about 1.0 to facilitate extrusion.

Alternatively, the outer layer may be formed of other thermoplastic materials as for example polypropylene, ethylene-propylene copolymer, ionomer or a member of the polyethylene family such as linear low density polyethylene (LLDPE), very low density polyethylene (VLDPE), or blends of these materials. VLDPE is also called "ultra low density polyethylene" and comprises copolymers of ethylene with alpha-olefins, usually 1-butene, 1-hexene or 1-octene, and in some instances terpolymers, as for example of ethylene, 1-butene and 1-hexene. The densities of VLDPEs are recognized by those skilled in the art to range between about 0.86 and about 0.914 g/cm$^3$. In a preferred film, the outer layer is a blend comprising 75 wt. % VLDPE and 25 wt. % EVA.

The outer layer thickness is preferably between about 0.5 and 1.0 mils. Thinner outer layers may be less effective in performing the abuse resistance protection, while thicker outer layers may reduce heat shrinkability of the multilayer film.

As noted above, the core layer 16 functions to limit oxygen transmission through the film. This is necessary to avoid spoilage of certain foods enclosed in the cook-in film package due to oxygen passage from the environment through the film wall. This requirement is more important where the encasing cook-in film is not removed for retail sales and may be satisfied by numerous well-known barrier layer materials. Examples of suitable materials include certain of the polyamides (nylon), hydrolyzed ethylene vinyl acetate copolymer (EVOH) and preferably a vinylidene copolymer, most preferably a vinylidene chloride-methyl acrylate copolymer i.e. MA-VDC. An MA-VDC type barrier layer is preferred because the oxygen barrier property is not affected by moisture, adhesive layers are not required and discoloration during cooking is minimal.

Inner layer 18 of the film has the film surface 20 in direct adhesive contact with the cooked food product. This inner layer preferably has a thickness of between about 0.5 and about 2.0 mils. Thinner layers may not be adequate to perform the intended functions of this layer while thicker layers may reduce total film performance.

The film inner layer contains an EVA preferably having a VA content of between about 3% and about 18% by weight VA. A VA content in this range provides the preferred biaxial orientation needed for heat shrinkability, adhesion to the core layer 16, and also the cook-out (purge) and food adhesion needed for improved cook-in performance. A higher VA content tends to make the film excessively soft and not capable of the biaxial orientation needed for production of a shrink film. The melt index of the ethylene vinyl acetate inner layer is preferably between about 0.1 and 1.0. Lower melt indexes are not preferred because the resulting high viscosities make extrusion very difficult, whereas higher melt indexes are preferably not used because orientation strength is diminished.

The food adhering surface of the present cook-in films may have EVA as the major constituent or may be substantially completely EVA or may comprise a blend of EVA and another compatible thermopolymer material as for example an unneutralized copolymer of the ethylene acrylic acid (EAA) type as described in the aforementioned U.S. Pat. No. 5,021,266. In particular, a suitable blend is in the range of 30-75 wt. % of EVA and 25-70 wt. % EAA, preferably 60% EVA and 40% EAA. As another alternative, EVA may be present as a minor constituent as described in a subsequent example wherein the food adhering surface is 25 wt. % EVA and 75% VLDPE. In this instance, the VLDPE broadens the heat sealing range for the food adhering surface and this may be desirable where this surface is heat sealed to itself as the inner layer of a food package in the tubular form.

The multilayer film preferably as used in the food product package of the present invention could be formed as a flat sheet using a slot die and tentering to achieve biaxial orientation. Preferably, the film is manufactured in tubular form by simultaneous coextrusion of the three layers using a double bubble biorientation technique as disclosed for example in Pahlke, U.S. Pat. No. 3,456,044. In this technique an extruded primary tube leaving the tubular extrusion die is cooled, collapsed, and then preferably oriented by reheating and reinflating to form a secondary bubble. The film preferably is biaxially oriented wherein transverse orientation (TD) is accomplished by inflation to radially expand the heated film and machine direction orientation (MD) is accomplished with the use of rolls rotating at different speeds to pull or draw the film tube in the machine direction. The biaxially oriented tube is cooled, flattened and guided through an ionizing radiation field at a dosage of at least about 2 MR.

The stretch ratio in the biaxial orientation is preferably sufficient to provide a multilayer film with total thickness of between about 1.5 and 3.5 mils. The MD stretch ratio is typically 3-5 and the TD stretch ratio is typically 3-5. A stretch ratio (MD stretch multiplied by TD stretch) of about 9-25:1 is suitable.

The preferred biaxially oriented heat shrinkable multilayer film is preferably wound up as flattened, seamless, tubular film. The tubular film may then be formed into bags by end seals, typically made by clips or by transverse heat sealing across the width of flattened tubing followed by severing the tubing so that the transverse seal forms the bag bottom. Alternatively side-seal bags may be formed in which the transverse seals form the bags sides and one edge of the tubing forms the bag bottom, or the tubular stock may be slit into sheet stock for further forming into back-seamed tubes by forming an overlap or fin-type seal. In still another embodiment the tubes may be shirred and then stuffed with a food product using a conventional stuffing machine such as a Viskase Corporation SHIRMATIC® 600 Sizer which applies clips to seal both ends of the stuffed article.

One aspect of the cook-in films disclosed by both the '266 and '863 Patents is that the film surface in contact with the food product should contain starch particles uniformly dispersed over the surface at the rate of at least about 20 gm/1000 ft$^2$. The presence of these starch particles not only prevents blocking when the irradiated tubular film is in a laid flat condition, but the particles improve the meat adhering characteristics of the irradiated EVA and EVA/EAA inner layers. For example, U.S. Pat. No. 4,784,863 discloses that irradiated starch particles on a meat adhering film surface formed of EVA is essential for acceptable meat adhesion. However, U.S. Pat. No. 5,051,266 discloses that acceptable meat adhesion is obtained without the use of starch if the meat adhering film surface formed of EVA includes at least 25% by weight EAA.

In the present invention, small particles preferably formed of starch of about 22-24 micron average size formed of starch are preferably applied to the film inside surface before irradiation and corona treatment, at a rate of at least 20 gm/1000 ft$^2$ and preferably between about 25 and about 30 gm/1000 ft$^2$. These starch particles prevent blocking. They also create voids or air gaps between the film inner surfaces in which the corona discharge occurs, thereby enhancing performance by reducing cook-out (purge). The starch particles may be applied to the EVA-containing surface while the latter is hot as during extrusion, but may alternatively or additionally be applied after extrusion when the film inner surface is cold. Reference is made to both U.S. Pat. No. 4,784,863 and U.S. Pat. No. 5,051,266, the disclosures of which are incorporated herein by reference, for a more detailed description of the starch application.

If the film is to be printed, the starch particles are preferably applied in two loadings, initially during extrusion up to a concentration of about 12 gm/1000 ft$^2$. At least the initial loading of starch particles is preferably irradiated for improved fat-out (purge) and higher food adhesion. The film is then printed and after printing the remaining starch is applied.

In accordance with one embodiment of the present invention, the food adhering surface of the irradiated tubular cook-in film is subjected to a corona treatment to provide enhanced adhesion to the food product cooked in the film. In this respect, FIGS. 3 and 4 illustrate in schematic fashion the corona treating operation used for the film described in the following examples.

Figure 3:
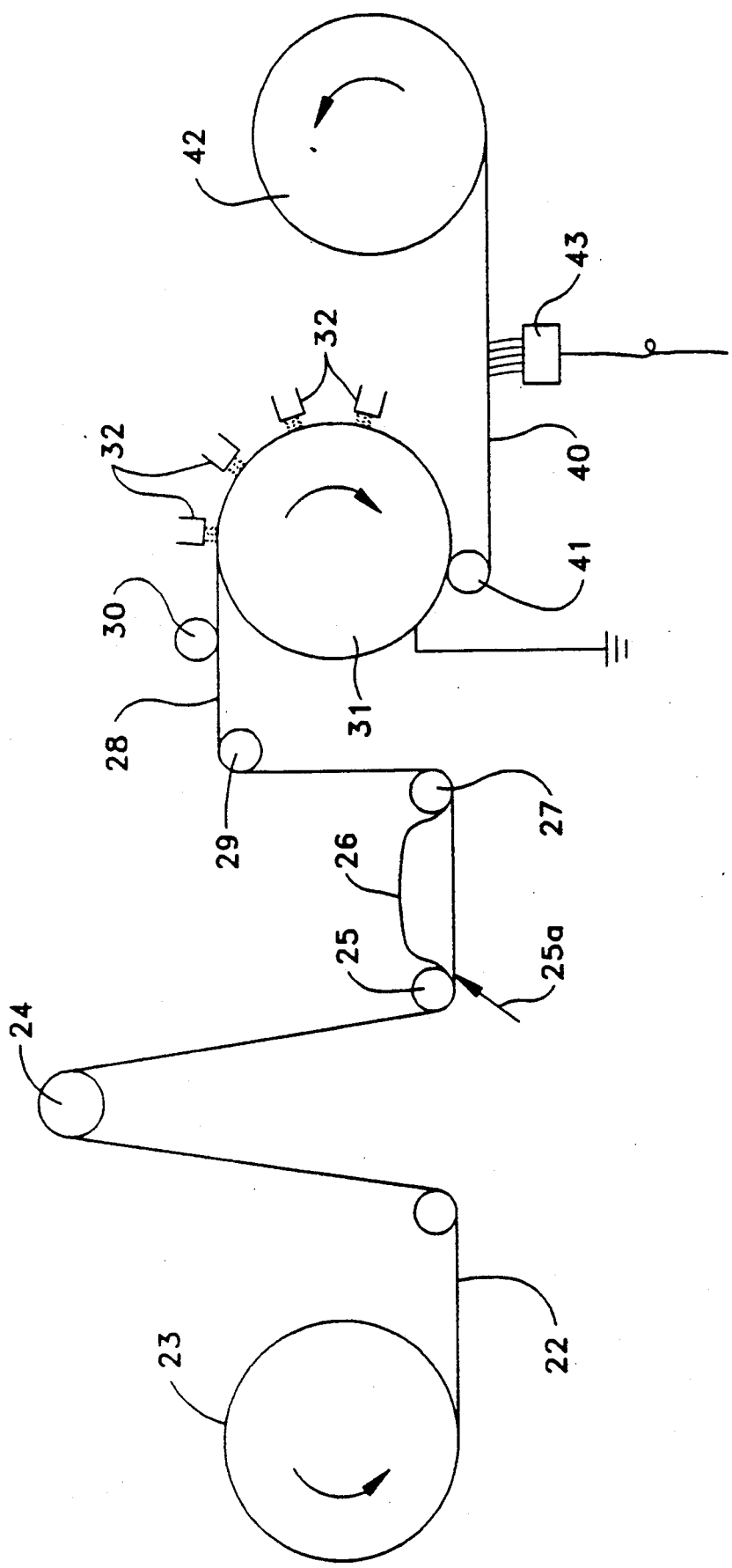
FIG. 3 is a schematic drawing of process steps suitable for corona treatment of powdered starch-containing irradiated tubular film.

FIG. 3 shows an irradiated tubular film 22 with irradiated starch particles on its inside surfaces, which is wound off supply roll 23 as a flattened tube, over tension control dancer roll 24 and then over upstream roller 25 making a 90° wrap. Sufficient pressurized air is periodically introduced through flexible hose 25a to separate the tube inner surfaces and form reserve air bubble 26 maintained by and between upstream roller 25 and downstream roller 27. The film is thereby wrapped about 90° to minimize air transport to the corona treatment system. The air introduction may for example be when a new roll 23 is positioned and threaded through the system. A small quantity of air is carried through downstream nip roller 27 entrapped in the voids between starch particles captured between the opposite inside surfaces of the tube 28 as it is consecutively moved in a loose "S" wrap configuration by rollers 27 and 29 and through intermediate roller 30 respectively to contact with electrically grounded rotating drum 31. The purpose of this restricted air introduction is to further separate the starch particles within the flat tube, prevent agglomeration and increase the void space between particles within the flat tube.

Figure 4:
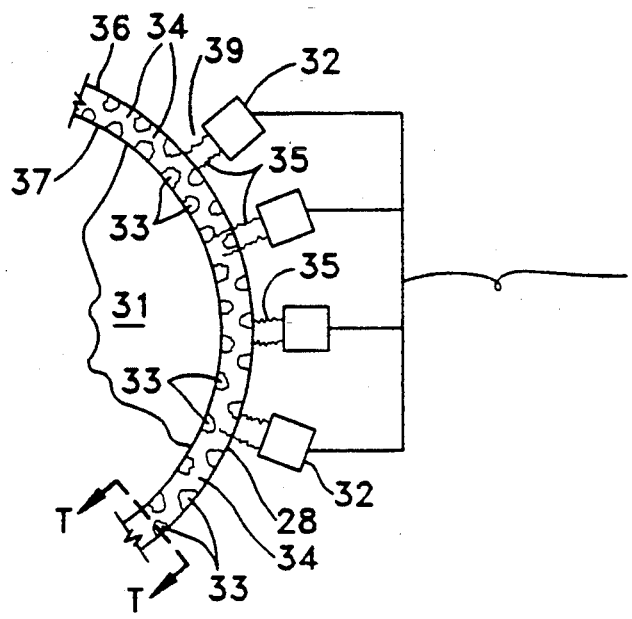
FIG. 4 is an enlarged detailed schematic drawing of the FIG. 3 corona treatment.

As shown more clearly in detailed schematic FIG. 4, multiple electrodes 32 are circumferentially spaced from and around a portion of circumference of rotating drum 31. Starch particles 33 adhered to opposing inside surfaces of flat film 28 provide voids 34 which contain entrapped air carried over from reserve air bubble 26, but the starch particles are the sole means of separating opposite inner surfaces of the film. A corona charge 35 is applied by electrodes 32 across tube 28 to grounded rotating drum 31 in accordance with the corona treatment method invention. This is facilitated by the voids 34 within tube 28 which exist among the starch particles providing pathways for discharge of the electric arc between the tube inside surfaces. In this particular covered roll-metal electrode system purchased from Pillar Company as Model AB 1326-1A (Hartland, Wis.), drum 31 is 12 inches diameter and has five electrodes spaced 4 inches center-to-center. The applied wattage is about 1870, comprising about 9.7 amperes and about 193 volts. It has been determined that for the small scale system used in the examples of this specification, a starch powder loading of 20–30 gms/1000 ft$^2$ film surface is necessary to provide the void volume needed to establish and maintain the corona discharge. The air introduced through removable hose 25 is periodically replenished, but is not present in sufficient quantity to actually inflate tube 28. The air does open the flat tube which on occasion may be slightly blocked. By way of illustration, about 0.5 cu. ft. STP air is introduced and consumed during corona treatment of 3,000 ft. of 8½ inch flat width tubular film.

In this particular equipment, the major portion of the outside surface corona discharge is formed between the electrodes 32 and the top layer 36 of tube 28. A sufficient corona also forms inside the film tube 28 because of the aforedescribed void space among starch particles. Another smaller corona also occurs between the bottom layer 37 of tube 28 and the covered treated roll 31. It has been observed that when there are numerous unadhered starch particles in the air-containing casing 26 because of high loading, eg. 30 gm/1000 ft$^2$, virtually all of these starch particles are adhered to the EVA-containing inside surface during corona treatment.

It should be noted that the FIG. 4 corona discharge zone of this system does not require power-driven nip rolls for moving starch-containing flat tube 28 through this zone. Since the tube is flat and not inflated, there is no need for the tube to be isolated from the rest of the system (as in the prior art corona treatment systems) to maintain the tube in the inflated condition. The voids 34 between particles 33 facilitate electric discharge from fixed-position electrodes 32 to grounded rotating drum 31. More particularly, the flattened tube 28 is moved in a loose "S" wrap configuration by rollers 27 and 29 with gas to increase the void space needed to facilitate the corona discharge. The fixed position electrodes 32 are of course much less expensive to manufacture than the conventional slip ring-containing roller electrodes employed by the prior art.

Another difference between the FIG. 4 corona discharge system and the aforedescribed prior art system is the structure and position of spaced position electrodes 34. They are fixed in position (except for longitudinal adjustment and then do not require the conventional slip ring. They are much simpler in construction and much lower in maintenance requirements than the conventional roller-type electrodes. Since they do not support flattened tube 28 in the corona discharge zone, they may be longitudinally spaced from the tube top layer outside surface 36 by air gap 39. This facilitates the aforementioned corona discharge 35 on the top surface 36 in addition to the tube inner surface 37. Corona treatment of the flat tube top layer outside surface 36 may be desirable to improve ink adhesion during one-sided printing.

In the corona treatment method aspect of this invention, air is used to fill the voids between adjacent particles within the flat tube, but other gases are usable as for example nitrogen, carbon dioxide, or other gases.

Whereas starch particles are preferred as the inner layer separating means other types of particles less than about 1.5 mil (37 microns) average size may be used, as for example silica powder. If the inside surface corona treated film is to be used for packaging food, as for example in the aforedescribed cook-in system to produce a cooked food product package, the particles are in direct contact with food and should be approved by the appropriate governmental agencies for this use.

Also, in this corona treatment method the particles may have already been adhered to the tube 28 inside surfaces before corona treatment, as described in connection with FIG. 3. Alternatively a portion of the particles are adhered to the tube inside surface prior to the gas introduction and the initially unadhered particles are preferably adhered to the tube inside surface during the electric discharge.

With respect to the quantity of particles required in the corona discharge method of this invention, they must be sufficient in quantity to separate at least a portion of opposite inside surfaces of the flat tube in the tube transverse direction (shown as dashed line T—T in FIG. 4) to provide voids between the particles within the flat tube. The voids must in turn be of sufficient volume so that an electric discharge pathway may be established across the opposite inside surfaces of the non-inflated tube through the voids. In the experiments comprising the working examples described herewithin, it was determined that at least about 20 gms starch/1000 ft$^2$ tube inside surface is needed to establish and maintain the electric discharge and realize the desired corona treatment. A preferred range is between about 20 and about 30 gms starch particles/1000 ft$^2$ tube inside surface. This quantity of starch particles is also sufficient to prevent the tube inside surfaces from blocking after the corona treatment.

One difference between the cooked meat product package aspect of this invention and the corona treatment method aspect of the invention is that the inner surface of the thermoplastic tubular film used in the method need not, but preferably contains ethylene vinyl acetate. However, this inner surface is preferably a polyolefin as for example homopolymers of olefins, copolymers of olefins (including terpolymers), and copolymers of the olefin and other monomer copolymerizable therewith such as other vinyl monomers. Specific examples of such polyolefins suitable for use as the inner surface to be corona treated include polyethylene having a very low density to high density, polypropylene, polybutene, copolymers thereof, ethylene-acrylic acid copolymers, and modified polyolefin resins. Typical examples of the modified polyolefin resins include modified polymers prepared by copolymerizing, e.g. graft copolymerizing, the homopolymer of the olefin or copolymer thereof with an unsaturated carboxylic acid, e.g. maleic acid, fumaric acid or the like, or a derivative thereof such as anhydride, ester or metal salt or the like. These modified polymers are useable singly or in mixture with each other or with other resin components, e.g. other polyolefin resins.

Although the film inner surface used in the method aspect of the invention is preferably formed of polyolefin, other thermoplastic materials can be used, as for example polyesters, polystyrene, polyvinyl chloride and polyamides.

The film to be corona treated by the method of this invention may be a monolayer, with the material of the inner surface comprising the entire film. Alternatively it may be a multilayer film as for example the type useful as the previously described preferred cook-in film comprising three layers. In this embodiment the inner layer is the layer whose inside surface will be corona treated, the core layer is the oxygen barrier, and the outer layer provides abuse resistance.

The to be corona treated film may be manufactured in the same manner as the previously described cook-in film. Unlike the latter, in the corona treatment method of this invention the film is not necessarily irradiated. Moreover it need not necessarily be biaxially oriented as this will depend on the end use.

Notwithstanding the aforedescribed advantages of the corona treatment method of this invention, the cook-in film used to prepare the cooked food product of this invention may be corona treated in the conventional manner instead of the FIGS. 3-4 system. More particularly the corona treatment system may be placed between horizontally spaced nip rollers. Inflation air would be introduced between the spaced nip rollers to form a stable bubble. A multiplicity of roller-type electrodes would be longitudinally spaced in pairs on opposite sides of the film bubble, with one dielectric unit of each pair attached to the power supply and the other bare metal unit being grounded. It is believed that notwithstanding the metered air gap between electrodes—about 0.06 inch, it would still be desirable to use small particles eg. starch, to prevent blocking of the corona treated EVA-containing inside surfaces.

Returning now to FIG. 3, the irradiated and corona treated film tube 40 is guided off rotary drum 31 by guide roller 41 and then wound onto take-up roll 42. If needed the external surface of tube 40 may be first contacted by brushes 43 to wipe off corona treatment occurring on the tube external surface and thus avoid the possibility of external blocking of the irradiated and corona treated film in roll 42.

Internal blocking may be a concern if this irradiated and corona treated film is stored in roll form for a sustained period before consumption, particularly if the roll is relatively large in diameter, eg. at least 16 inches, and/or the roll is stored at high temperatures. In this event, internal blocking probably could be avoided by the use of additional internal and external starch particles, looser rewind tension, cool storage or other means to minimize roll hardness. Alternatively, the film could be formed into shirred sticks, i.e. longitudinally compressed into pleats, as is well understood by those skilled in the art. It is believed that in general, the compressive forces on the tube inner surfaces are substantially lower in the shirred stick form than in the roll form, so the blocking tendency is greatly diminished by shirring and storing the irradiated and corona-treated film tube as sticks rather than in roll form.

The purpose of corona treatment is to increase the wetting tension or surface energy of the meat contacting film surface. For purposes of purge reduction, a high wetting tension and good adhesion of the film to the meat product is desired. The intensity of the corona treatment depends in part on the speed of the film over the rotating, grounded drum 31, and on the density of the electrical discharge. For purposes of the present invention, corona treatment is preferably sufficient to increase the surface wetting tension of an EVA-containing film to at least about 36 dyne/cm. The surface wetting tension is preferably less than about 50 dyne/cm so that adhesion is not so great as to cause disruption of the cooked meat surface when the film is removed. Excessively high adhesion could result in chunks of cooked meat remaining on the film surface. Those skilled in the art will recognize that the meat's resistance to surface disruption depends to some extent on its own internal cohesive forces. For example, high protein meats have greater resistance to surface disruption than meats with high fat or high water content.

Embodiments of both main aspects of the present invention (including the cooked food product package, the cook-in film and the corona treatment method) are illustrated by the following examples. In these examples the films used as the controls are commercial cook-in films. In particular, one commercial film is a three layer cook-in tubular film of the type described in U.S. Pat. No. 4,784,863. The core layer of this film is 75% vinylidene chloride-methyl acrylate, 25% vinylidene chloride-vinyl chloride and its outer layer is a 75/25 weight ratio VLDPE/EVA blend. The meat adhering inner layer of this tubular film is composed of EVA having a VA content of about 10 wt. %. Another commercial film, also a three layer cook-in tubular film, is of the type disclosed in U.S. Pat. No. 5,051,266. This film also has a MA-VDC core layer and a 75/25 VLDPE/EVA blend in the outer layer. However, the meat adhering layer of this film is composed of a 65/35 weight ratio blend of EVA and EAA wherein the VA content of the EVA is about 10 wt. %. Commercial films of both types have starch particles uniformly distributed over the meat contacting surface at a dosage rate of about 20 g/1000 ft$^2$ and each film after starch application is subjected to an irradiation of about 4 MR.

EXAMPLE I

A commercial three layer film as disclosed in U.S. Pat. No. 5,051,266 was used as a control. This film as noted above is a tubular film having a MA-VDC core layer and an inner layer composed of the aforedescribed blend of EVA and EAA. The outer layer of the tubular film is a blend of 75% VLDPE (density 0.912) and 25% EVA (10% VA). The film has starch particles applied to its inner surface during extrusion at a level of about 20 gm/1000 ft$^2$ and then the film is irradiated (externally) at a dose of about 4 MR.

Samples of the same three layer film structure were irradiated at a dosage level of about 4 MR and then these samples were internally corona treated as described above. Instead of the 12 gm/1000 ft$^2$ starch used with the prior art films, a higher level of 20 to 30 gm/1000 ft$^2$ was applied to the EVA-containing inner layer during extrusion and prior to irradiation. This was preferred to avoid blocking between the tube inner surfaces which because of the present invention are more adhesive than the corresponding prior art surfaces.

It was found that the internal surface of the control film had a wetting tension of about 34 dyne/cm as determined by ASTM Test Method D2578-67. By the same test method, the wetting tension of the internal surface of the corona treated samples was about 39 dyne/cm. Also, in the particular method used to apply a corona discharge on the tube inner surface in the working examples of the specification, this level of starch loading was necessary to provide the voids to excite an ionizing discharge inside the tube.

All films were stuffed with a chunked ham formulation wherein the target stuffed circumference was 1.07 times the measured unstuffed circumference to insure that the film was taut about the meat product. After stuffing, the meat product packages were cooked with steam until the package reached an internal temperature of 155° F. and thereafter the packages were showered with tap water for about 40 minutes.

Evaluation involved weighing the package after cooking and then stripping the film from the cooked meat product. All the exudate is removed from both the stripped film and the meat surface and the film and cooked meat are then reweighed. The cook-out weight loss or "purge" represented by the removed exudate is expressed as a percentage of the cooked meat product package weight. The results of these tests are set out in Table I.

Also, the adhesion between the film inner surface and the meat surface for each package was evaluated using an Instron machine mentioned hereinabove. In the test procedure a one inch wide by six inch long test strip was slit in the meat product package. The package was placed on a horizontal plane and the one inch slit end of the strip was attached to the load cell of the Instron machine. The test was initiated by lowering the plane at a rate of about 10 inches per minute and the force required to pull the six inch test strip of film from the encased meat was recorded. This force varies as increments of the strip are pulled from the meat surface and the average force to peel is noted in Table I below.

The results of adhesion and purge tests, all conducted as noted hereinabove, are reported in Table I. Each sample is the averaged performance of two cooked meat product packages.

g/1000 ft². This base film was used to produce each of the test samples as noted below.

For Sample D, the film was laid flat and irradiated to a level of about 4 MR.

For Sample E, the film was not irradiated but the inner surface of the tubular film was subject to a corona treatment in a manner as described hereinabove, and in accordance with the corona treatment method of this invention.

For Sample F, the film was laid flat and irradiated to a level of about 4 MR. After irradiation the inner surface of the tubular film Sample F was corona treated in accordance with the corona treatment method of this invention.

The wetting tension of each film was tested using the same ASTM Test Method D-2578-67. The tubular films were then each stuffed with a chunked and formed ham product wherein the target stuffed circumference for each piece was 1.07 times the measured circumference of the unstuffed film. All meat product packages were then cooked with steam to an internal temperature of 155° F.

After cooling, the cooked product packages were tested for adhesion and purge in the same manner as previously described. The results of these tests, together with the wetting tension of each film sample, is set out in Table II. Each sample is the average performance of two cooked meat product packages.

TABLE II

| Corona Treating and Irradiation Alone and Together | | | | |
|---|---|---|---|---|
| Sample | Irrad | Inside Corona Treatment | Wetting Tension (dynes/cm) | Adhesion (gm/inch) | Purge (%) |
| D | Yes (4MR) | No | 32 | 37.9 | 1.30 |
| E | No | Yes | 38 | 51.7 | 0.57 |
| F | Yes (4MR) | Yes | 39 | 60.3 | 0.24 |

TABLE I

| | | | Chunked Ham Adhesion | | | | |
|---|---|---|---|---|---|---|---|
| Sample | Irradiated Film Type | Wetting Tension (dyne/cm) | Flatwidth (inches) | Target Circumference (inches) | Stuffed Circumference (inches) | Adhesion By Instron Test (gm/inch) | Purge (%) |
| A | (Control) | 34 | 7.00 | 15.00 | 15.06 | 73 | 1.00 |
| B | (Corona treated) | 39 | 7.88 | 16.80 | 15.80 | 109.7 | 0.30 |
| C | (Corona treated) | 39 | 8.0 | 17.10 | 17.2 | 109.7 | 0.30 |

The results as shown in Table I demonstrate that a cooked meat product package having an irradiated and corona treated meat adhering EVA-containing inner surface (samples B and C) provides enhanced purge and meat adhesion characteristics over the control package (sample A) including the same irradiated but not corona treated, EVA inner surface.

EXAMPLE II

In a second test, three commercial films of the type disclosed in U.S. Pat. No. 4,784,863 were compared to determine the relative effects of irradiation and corona treatment on the meat adhering properties of the film.

This film was a three layer biaxially oriented heat shrinkable tubular film of 11 inches flat width having an MA-VDC core layer, a 100% EVA inner layer and an outer layer composed of the same VLDPE-EVA blend as the film of Example 1. During extrusion of films for this test, starch particles were applied to the inner surface of the film at a rate of about 12 g/1000 ft². In an off-line process, additional starch was applied to the film inner surface at a level of about 18 g/1000 ft² bringing the total level of powdered starch up to about 30

Examination of the test results as reported in Table II confirm that the films having the greatest meat adhesion had lowest purges and consequently will provide the highest yields after cooking.

However, a further and surprising result of these tests is seen in the comparison of Samples E and F. In this regard the results show that both corona treated Sample E and F had about the same wetting tension of 38-39 dyne/cm. Accordingly, it would be expected that both samples would have comparable adhesion and purge characteristics. However, and surprisingly, the irradiated and corona treated film Sample F had higher adhesion and less purge than the nonirradiated but corona treated Sample E.

EXAMPLE III

Another series of tests was run to compare the sequence of irradiation and corona treatment of EVA-containing films as affecting the purge reduction and improved meat adhesion achievable with this invention.

The films used in the Example II tests were also used in this series, and the cook-in procedure was identical. Sample G was identical to Sample F except that it was used to package high water content (48%) chunk and form ham emulsion about one month following completion of the first irradiation—then corona treatment sequence, and was used in the Example III cook-in tests about two months after the Example II tests. Sample H was the original corona treatment-only Sample E, which was then irradiated at 4 MR about one month later. Two cook-in meat product packages were prepared comprising each sample. The data is summarized in Table III, and shows that the adhesion and purge values for Samples G and H are very similar. This demonstrates that the sequence of irradiation and corona treatment is not critical to realizing the advantages of the invention, which are fully accomplished irrespective of which step is performed first. The Sample G data demonstrates that if this particular EVA-containing surface (comprising 100% EVA) is subsequently corona treated, the synergistic combined effectiveness does not rapidly deteriorate over a period of at least two months.

TABLE III

Corona Treating-Irradiation Sequence

| Sample | Sequence | Wetting Tension (dynes/cm) | Adhesion (gm/inch) | Purge (%) |
|---|---|---|---|---|
| G | 1st Irradiation 2nd Corona Treatment | 38 | 24.5 | 0.31 |
| H | 1st Corona Treatment 2nd Irradiation | 37 | 22.7 | 0.38 |

As part of the Example III tests, another identical sample of the EVA-containing film with about 30 gms/1000 ft² starch was irradiated at 4 MR and used to enclose the same ham emulsion followed by the same cook-in treatment. This sample (without corona treatment) apparently provided about the same adhesion (25.0 gms/in) and purge (0.33%) as the invention Samples G and H, but this result was inconsistent with all other irradiation—only tests as example, Sample D. This discrepancy is believed due to mix up of samples, and Table II is believed to be a qualitatively and quantitatively correct comparison.

As still another part of the Example III tests, the film of Sample E (within only corona treatment and no irradiation) was retested about two months after the original corona treatment. The resulting cook-in meat product package provided much higher purge (3.95%) and poorer adhesion (1.1 gms/in). These results are very inferior to the original Sample E test (0.57% purge and 51.7 gms/in adhesion), and suggest that without irradiation, the corona treatment decays much more quickly and loses its effectiveness. This is in marked contrast to the previously discussed Sample G performance relative to Sample H.

EXAMPLE IV

This series of tests was performed to demonstrate that the EVA-containing surface to be used for meat contact in accordance with this invention need not comprise primarily EVA, nor is the presence of starch particles essential for improved cook-out (purge) and meat adhesion.

The tubular film (flat width about 11 inches) used in these tests was identical to the Example II film, i.e. MA-VDC core layer, a 100% EVA inner layer and a 75% VLDPE-25% EVA outer layer. Sample I was prepared from this film for comparison purposes After irradiation at 4 MR, this film was corona treated on its outside surface and the wetting tension was determined to be 37 dyne/cm. The corona-treated tube was turned inside out so that the corona treated surface was on the inside (Example J). Ten months later the same inverted film (Sample K) still had the same wetting tension of 37 dyne/cm.

These tubular films were used to package the same high water content chunk and form ham emulsion used in Example III, and hot water-cooked in the same manner. The results of these tests are summarized in Table IV, and each sample represents the average of two packages.

TABLE IV

| | | Low EVA Content Surface | | | |
|---|---|---|---|---|---|
| Sample | Corona Treatment | Inside Surface | Wetting Tension (dyne/cm) | Purge (%) | Adhesion (gm/inch) |
| I | No | 100% EVA | 34 | 1.55 | 35.4 |
| J | Yes | 75% VLDPE | 37 | 0.09 | 137.1 |
| K | Yes | 75% VLDPE | 37 | 0.32 | 24.5 |
| L | No | 75% VLDPE | 32 | 0.33 | 23.6 |

Table IV confirms that improved cook-out (purge) and meat adhesion is obtained when the meat contacting surface contains only 25% EVA, the balance being VLDPE. More specifically, Samples J and K (25% EVA—75% VLDPE meat contacting surfaces which had been irradiated and then corona treated) each displayed much lower purge values than Sample I (100% EVA meat contacting surface which was only irradiated and not corona treated). This improvement was obtained despite the fact that the wetting tensions were only slightly higher, i.e. 37 vs 34 dyne/cm.

Table IV also demonstrates that after a 10 month storage period, the purge value undesirably rose and the adhesion diminished for the irradiated then corona treated 25% EVA—75% VLDPE meat contacting surface. In particular Sample J provided purge and adhesion values of 0.09% and 137.1 gm/inch respectively, whereas after 10 months the same film (Sample K) provided purge and adhesion values of 0.32% and 24.5 gm/inch respectively. From this data it appears that the effectiveness of the 25% EVA—75% VLDPE meat contacting surface diminishes with time, and for best results the film should be used to form a cook-in meat product package reasonably soon after irradiation-corona treatment.

Sample L comprised an irradiated but not corona treated 25% EVA-75% VLDPE meat contacting surface formed by inverting the same tube used to form Samples J and K. The purge value (0.33%) was unexpectedly low and the adhesion was similar to Sample K. This was an anomalous result and inconsistent with the performance of other EVA-containing irradiated but not corona treated meat contact surfaces such as Sample A (Table I) and Sample D (Table II). The latter are believed to accurately reflect the qualitative and quantitative performance of such surfaces.

It should be noted that invention embodiment Samples J and K did not include a coating of starch particles on the meat contacting surface, unlike the invention embodiments of Examples I–III. This was because the film tubes were prepared by inverting a tube of the type in commercial use wherein the original inside surface was coated with starch particles, but not the outside surface. Accordingly, Samples J and K demonstrate that the irradiated and corona treated EVA-containing meat contact surface of this invention need not have irradiated starch particles therein to achieve the improved cook-out (purge) and meat adhesion of this invention. However, small particles such as powdered starch are preferably deposited to at least avoid blocking on the EVA-containing surface even if not needed to reduce cook-out and enhance meat adhesion performance.

On the basis of these examples it is apparent that the combination of irradiation and corona treatment of the EVA-containing inner layer of the cook-in films provide surprisingly enhanced meat adherence and cook-out (purge) characteristics over the corresponding prior art on corona treated or irradiated films. Moreover, this enhancement of adhesion and cook-out (purge) characteristics appear to be synergistic since the enhancement occurs despite the fact that corona treated films have comparable wetting tension regardless of whether the films are irradiated.

While a preferred embodiment of the invention has been described, it should be appreciated that changes and modifications may be made without departing from the spirit and scope of the invention. For example, although oxygen barrier type multilayer films have been described in detail, some cook-in applications may not require an oxygen barrier. In this event, the EVA-containing layer may comprise the entire film which for example may be prepared in the biaxially oriented heat shrinkable form by the aforedescribed double bubble process. As another variation, the inventive film need not be shrinkable but may be prepared as a blown or cast mono or multilayer film having little or no shrink. Such a film must rely on enhanced wetting tension for meat adherence. As a still further variation, instead of the preferred starch particles adhered to the EVA-containing surface, this function would be performed by small, eg. 30–35 micron particles of other materials suitable for direct contact with food, eg. silica.

We claim:

1. A method for corona treating the inside surface of a flexible thermoplastic tubular film comprising the steps of providing a substantially flat film tube with particles of less than about 1.5 mil average size within the inner space of said flat tube in sufficient quantity to separate at least a portion of opposite inside surfaces of said flat tube in the transverse direction and provide voids between the particles within said flat tube; and establishing an electric discharge across said opposite inside surfaces through the voids of the particle-containing flat tube so as to corona treat said inside surfaces.

2. A method according to claim 1 wherein said particles are starch.

3. A method according to claim 1 wherein said inside surface is a polyolefin.

4. A method according to claim 3 wherein the polyolefin inside surface contains ethylene vinyl acetate.

5. A method according to claim 1 wherein the particles are adhered to the tube inside surface prior to the electric discharge.

6. A method according to claim 1 wherein only a portion of said particles are adhered to the tube inside surface prior to the electric discharge and the initially unadhered particles are adhered to said tube inside surface during said electric discharge.

7. A method according to claim 1 wherein said particles are present within the inner space of said flat tube in sufficient quantity to prevent said tube inside surfaces from blocking after the corona treatment.

8. A method according to claim 1 wherein said particles are starch and present in quantity of between about 20 and about 30 gms/1000 ft$^2$ tube inside surface.

9. A method according to claim 1 wherein prior to said electric discharge, gas is introduced in the particle-containing flat tube inner space in sufficient quantity to further separate said particles without inflating said tube.

10. A method for corona treating the inside surface of a flexible thermoplastic tubular film comprising the steps of providing a substantially flat film tube with an ethylene vinyl acetate-containing inside surface and starch particles of less than about 1.5 mil average size within the inner space of said flat tube in quantity of between about 20 and about 30 gm/1000 ft$^2$ tube inside surface so as to separate at least a portion of opposite inside surfaces of said flat tube in the transverse direction and provide voids between the starch particles within said flat tube with at least a portion of the starch particles being adhered to the ethylene vinyl acetate-containing inside surface; introducing gas in the starch particle-containing flat tube inner space in sufficient quantity to further separate the particles without inflating said tube; and establishing an electric discharge across said opposite inside surface through the voids of the starch particle-containing flat tube so as to corona treat said inside surfaces.

* * * * *